Figure 1:
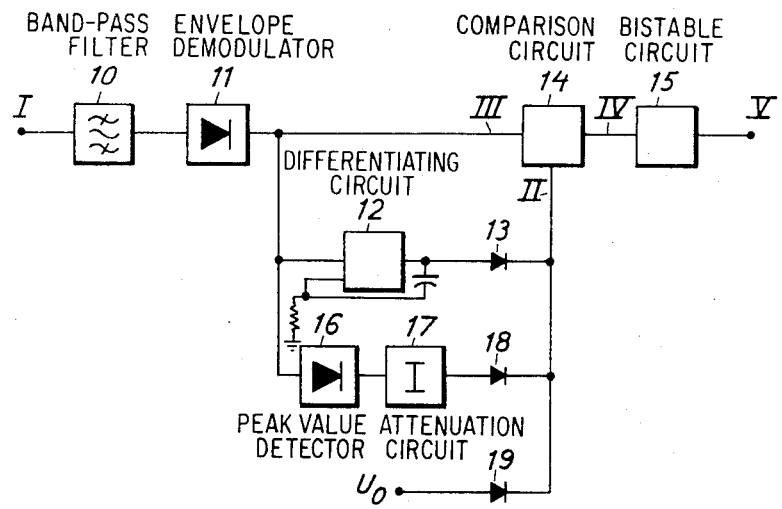

United States Patent [19]
Nilsson

[11] 3,757,132
[45] Sept. 4, 1973

[54] APPARATUS FOR THE DETECTION OF RECTANGULAR PULSES

[75] Inventor: Lars Konrad Nilsson, Hagersten, Sweden

[73] Assignee: Telefonaktiebolaget LM Ericsson, Stockholm, Sweden

[22] Filed: Mar. 24, 1972

[21] Appl. No.: 237,656

[30] Foreign Application Priority Data
May 17, 1971 Sweden.............................. 6365/71

[52] U.S. Cl..................... 307/106, 178/88, 325/321
[51] Int. Cl. ............................................. H04l 15/24
[58] Field of Search...................... 307/106; 178/88; 325/321

[56] References Cited
UNITED STATES PATENTS

| | | | |
|---|---|---|---|
| 2,613,272 | 10/1952 | Terry et al............................ | 178/88 |
| 3,473,131 | 10/1969 | Perkins................................. | 178/88 X |
| 3,496,472 | 2/1970 | Schindler............................. | 325/321 X |

*Primary Examiner*—Robert K. Schaefer
*Assistant Examiner*—M. Ginsburg
*Attorney*—Hane, Baxley & Spiecens

[57] ABSTRACT

The invention refers to an apparatus for the detection of rectangular pulses in which the duration of the leading edge and the trailing edge respectively is constant whereas the peak amplitude can fluctuate. The apparatus includes a comparison circuit that compares the instantaneous amplitude of the rectangular pulses with the amplitude of a reference voltage and which upon equality between the levels of the amplitudes being compared delivers an indicating pulse. According to the invention, the reference voltage is, during the leading edges formed by the output voltage from a differentiating circuit which is fed with the rectangular pulses and which during each of their leading edges delivers an output voltage the time function of which has such a predetermined intersection point with the time function of the leading edge that the amplitude value at the intersection point equals a selected fraction of the peak amplitude of the rectangular pulse.

5 Claims, 2 Drawing Figures

APPARATUS FOR THE DETECTION OF RECTANGULAR PULSES

This invention refers to an apparatus for the detection of rectangular pulses in which the duration of the leading edge and the trailing edge respectively is constant whereas the peak amplitude can fluctuate and to such apparatus which includes a comparison circuit that compares the instantaneous amplitude of the rectangular pulses with the amplitude of a reference voltage and which upon equality between the levels of the amplitudes being compared delivers an indicating pulse. The apparatus is principally adapted to be used in carrier telephone systems upon the reception of rectangular digit impulses transmitted by means of an AM-carrier in a narrow-band channel used merely for signalling.

Upon a narrow-band reception of rectangular pulses the duration of the leading and the trailing edges of the same will be increased in inverse proportion to the band width of the receiver. A problem arises when one uses a fixed detection threshold level because different pulse widths are detected for such rectangular pulses whereas such pulse widths in reality are constant but have different amplitude peak values. The problem is suitably solved by controlling the detection threshold level for each separate rectangular pulse in dependence on the peak amplitude of the same.

Apparatus for the detection of rectangular pulses by means of a controlled detection threshold level are previously known. The detection of the trailing edges of the rectangular pulses is in these apparatus usually accomplished by means of a comparison circuit that compares the instantaneous voltage of an actual rectangular pulse with the output voltage from an attenuation circuit whose input voltage is obtained from a peak value detector which is fed with the rectangular pulse and retains its peak value during the fall time of the trailing edge. When the levels of the two compared voltages coincide, an indicating pulse will be obtained from the comparison circuit.

For the detection of the leading edge of the rectangular pulses the known apparatus contain furthermore a delay circuit that causes the instantaneous voltage of the leading edge of a received rectangular pulse to be sensed by the comparison circuit after the output voltage of the peak value detector already has reached the peak amplitude of the rectangular pulse.

In one of the known apparatus said peak value detector is eliminated. The detection of the leading edge of a received rectangular pulse takes place in this case by letting a comparison circuit of the above-mentioned type compare the output voltage from an attenuation circuit with the output voltage from a delay circuit, both last-mentioned circuits being fed with the rectangular pulse and the ratio between the output voltage and the input voltage of the attenuation circuit being equal to the ratio between the delay time of the delay circuit and the rise time of the leading edge of the rectangular pulse.

The apparatus according to the invention differs from the known apparatus in that the leading edges of received rectangular pulses are detected without requiring any delay circuit. This is a great advantage for narrow-band reception of rectangular digit impulses in carrier telephone systems because in such systems the duration of the leading edge is prolonged to the order of milliseconds and such delays require too expensive delay circuits in the known apparatus.

The characteristics of the invention appear from the appended claims.

Figure 2:
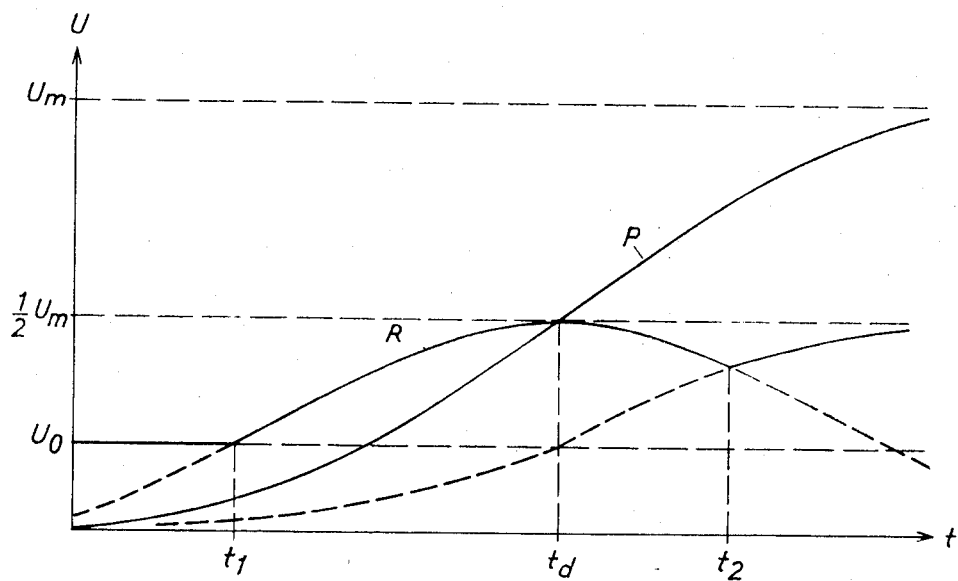

The invention is described below with reference to the accompanying drawing where FIG. 1 shows a receiver apparatus in which rectangular digit impulses are detected according to the principle of the invention, and where FIG. 2 is a timing diagram showing a reference voltage used for the detection of the rectangular digit impulses in the apparatus of FIG. 1.

In FIG. 1 a receiver apparatus is shown which is included in a not shown carrier telephone system and which on an input I receives in the main rectangular digit impulses represented by the amplitude modulation of an AM-carrier in a narrow-band channel used merely for signalling. The receiver apparatus comprises an input band-pass filter 10 and an envelope demodulator 11 for filtering and demodulation respectively of the received digit impulses.

The leading edge of a received digit impulse has after said filtering and demodulation a rise time which is inversely proportional to the band width of the input filter 10. This implies that the peak amplitude of the digit impulse can be determined beforehand, at an instant when only a fraction of the rise time of the leading edge has passed, as equal to the time derivative of the leading edge multiplied by a proportionality constant associated with the reciprocal value of said band width and with said fraction of the rise time of the leading edge. The non-linear waveform of the leading edge is assumed to be in the main unchanged for different peak amplitudes which is the case if the rate of change of peak amplitudes is low with respect to the rise and fall times.

The invention is based on the understanding that the above-mentioned method for determining the peak amplitude of a rectangular digit impulse can provide upon practical application the necessary accuracy for controlling the detection threshold level in proportion to the peak amplitude. In the receiver apparatus in FIG. 1 a differentiating circuit 12 is then used according to the principle of the invention, which circuit 12 is fed with the demodulated digit impulses delivered by the envelope demodulator 11 and which during the rise time of each of the leading edges of the digit impulses delivers an output voltage the time function of which has such a predetermined intersection point with the time function of the leading edge of the digit impulse that the amplitude value at the intersection point constitutes a selected fraction of the peak amplitude of the digit impulse, the peak amplitude being predetermined by the time function of the leading edge. According to the example, said fraction is equal to one-half and furthermore it is assumed according to the example that the input filter 10 and the envelope modulator 11 give the digit impulses such leading edges the first and the second halves of which are in the main reflected images of each other, which causes the intersection point to occur when half the rise time of the leading edge has passed and when the output voltage from the differentiating circuit 12 has its maximum value.

Via an isolating diode 13 the output voltage of the differentiating circuit 12 is fed to an input II of a comparison circuit 14 as a reference voltage for the detection of the digit impulses. The comparison circuit 14 receives at another input III the digit impulses from the envelope demodulator 11 and delivers an indicating pulse on an output IV when the levels of the inputs II and III are equal. The indicating impulses on the output IV of the comparison circuit 14 control a bistable circuit 15 so that an output V of said circuit will alternately switch between high and low level.

It is assumed that the output V temporarily has a high level as a consequence of the fact that the leading edge of a digit impulse has just been detected and that an indicating pulse has been delivered on the output IV of the comparison circuit 14. The trailing edge of the digit impulse will now be detected in a previously known manner by means of a peak value detector 16 connected to the envelope demodulator 11 which detector 16 during the fall time of the trailing edge retains an output voltage corresponding to the peak amplitude of the digit impulse and delivers this output voltage via an attenuation circuit 17 and an isolating diode 18 as a reference voltage to the input II of the comparison circuit 14. The output voltage of the attenuation circuit 17 is assumed to constitute according to the example 50 percent of its input voltage, in consequence of which the comparison circuit 14 will deliver an indicating pulse on the output IV when the instantaneous voltage of the digit impulse on the input III has decreased to half the peak amplitude. At this moment the bistable circuit 15 shifts from high to low level on the output V and the actual digit impulse is thus regenerated on the output V.

A fixed potential $U_o$ is, via an isolating diode 19, connected to the input II of the comparison circuit 14 in order to produce a minimum level for the reference voltage so that interference pulses below this minimum level cannot influence the bistable circuit 15. The differentiating circuit 12 which for example comprises an operation amplifier that in a known way is connected for differentiation by means of having a capacitor and a resistor in its feedback network can furthermore be provided with a band limiting filter in order to prevent the output voltage of the differentiating circuit 12 from being influenced by such interference signals which are small as to level but have a high frequency.

The timing diagram in FIG. 2 shows how the reference voltage R on the input II of the comparison circuit 14 varies before and after the moment $t_d$ of detection of the leading edge P of a received digit impulse. The peak amplitude of such digit impulse is $U_m$ and the detection threshold level is according to the example one-half $U_m$. The reference voltage R is during an intitial part of the rise time of the leading edge P of the digit impulse clamped to said fixed potential $U_o$ which is supplied to the input II via the blocking diode 19. From the moment $t_1$ up to the moment $t_2$ the reference voltage R follows the output voltage of the differentiating circuit 12 which output voltage is supplied to the input II via the blocking diode 13, the moment $t_d$ of detection occurring in the intersection point between the time funtion of the reference voltage R and the time function of the leading edge P digit impulse on the inputs II and III respectively of the comparison circuit 14. The output voltage of the differentiating circuit 12 has at this moment the value one-half $U_m$ which is its maximum value in accordance with what has been mentioned earlier. At the moment $t_2$ the time function of the decreasing output voltage level of the differentiating circuit 12 coincides with the time function of the increasing output voltage level from the attenuation circuit 17. The latter voltage level which rises towards one-half $U_m$, will consequently control, via the blocking diode 18, the level of the reference voltage R at the forthcoming detection of the not shown trailing edge of the digit impulse.

I claim:

1. Apparatus for detecting first signals whose instantaneous amplitude varies in time to define rectangular pulses which have leading and trailing edges of constant duration and peak amplitudes which can fluctuate, said apparatus comprising input means for receiving the first signals, signal differentiating means having an input connected to said input means and an output which signal differentiating means during the time of occurrence of the leading edge of each rectangular pulse transmits a time-varying output signal whose time function has a predetermined intersection point with the time function of the leading edge of the rectangular pulse such that the amplitude value at said intersection point equals a selected fraction of the peak amplitude of the rectangular pulse, said peak amplitude being predetermined by the time function of the leading edge of the rectangular pulse, a signal amplitude comparison means having an unknown signal input connected to said input means, a reference-signal input connected to the output of said signal differentiating means and an indicating-signal output for transmitting an indicating signal when the amplitude of the signal present at said unknown signal input equals the amplitude of the signal present at said reference signal input.

2. The apparatus of claim 1 further comprising a source of a fixed potential connected to the reference-signal input of said signal amplitude comparison means in parallel with the output of a said signal differentiating means.

3. The apparatus of claim 2 further comprising signal isolation means for connecting the output of said signal differentiating means and said source of fixed potential respectively to the reference-signal input of said signal amplitude comparison means.

4. The apparatus of claim 1 wherein said signal differentiating means comprises an operational amplifier having a resistor-capacitor feedback network.

5. The apparatus of claim 1 wherein said selected fraction of said peak amplitude is equal to one-half.

* * * * *